March 17, 1959   R. A. HOEGEE ET AL   2,878,039
COLLET AND FERRULE TYPE CLAMP HOSE COUPLING
Filed Nov. 22, 1954   2 Sheets-Sheet 2

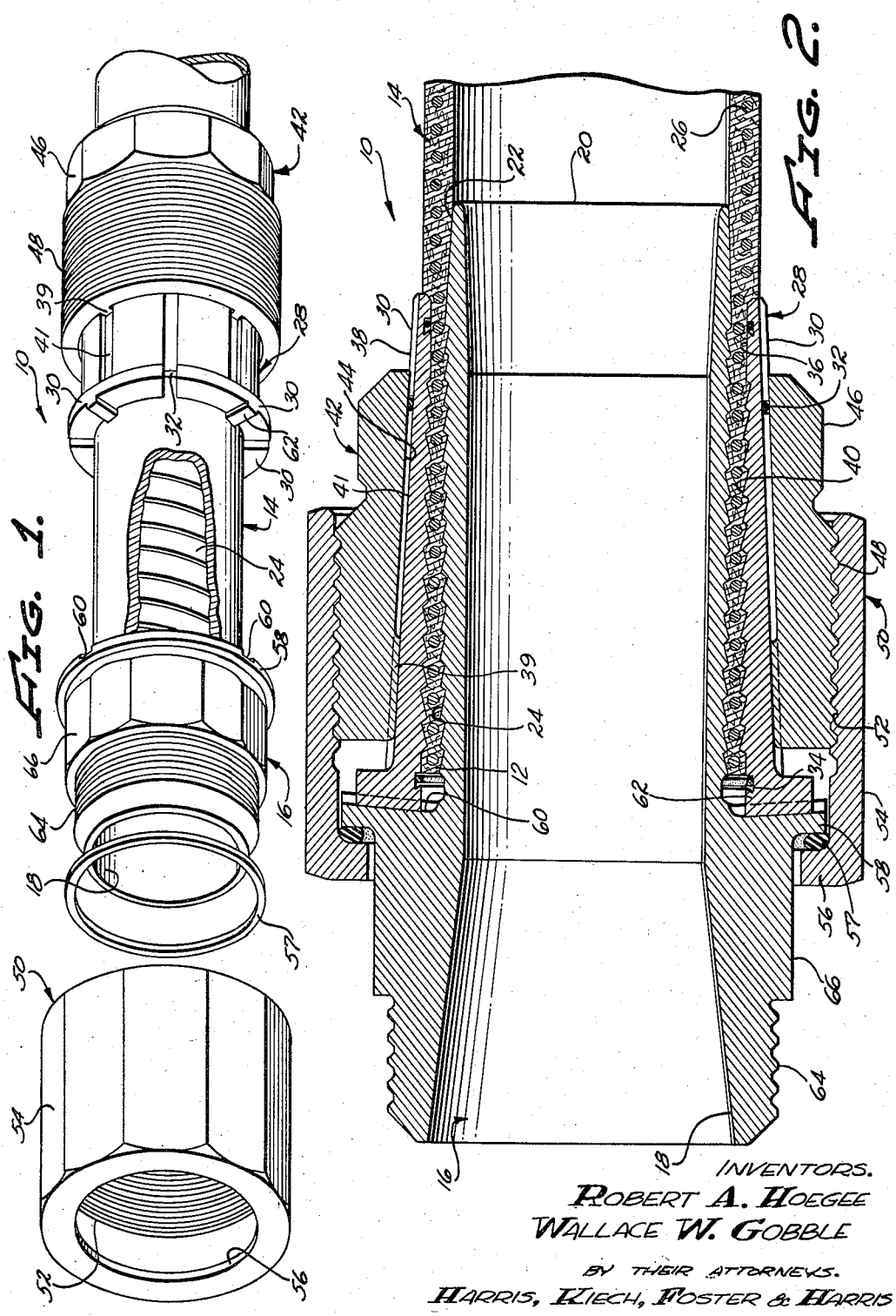

INVENTORS.
ROBERT A. HOEGEE
WALLACE W. GOBBLE
BY THEIR ATTORNEYS.
HARRIS, KIECH, FOSTER & HARRIS

United States Patent Office 2,878,039
Patented Mar. 17, 1959

2,878,039

COLLET AND FERRULE TYPE CLAMP HOSE COUPLING

Robert A. Hoegee, West Covina, and Wallace W. Gobble, Covina, Calif., assignors to Fletcher Aviation Corporation, Rosemead, Calif., a corporation of California Application November 22, 1954, Serial No. 470,208

2 Claims. (Cl. 285—249)

The present invention relates to a new and improved hose coupling which is primarily intended to be used for inflight refueling of aircraft, but which obviously has other utility.

A presently known feasible process of refueling aircraft during flight involves extending from a first aircraft a hose, on the extremity of which there is a hose coupling, an attached valve type mechanism, and an attached aerial drogue, so that the valve type mechanism can be engaged by a probe-like device upon a second aircraft. When the valve mechanism is engaged, fuel is transferred from the first aircraft to the second through the hose, the coupling, the valve mechanism, and the probe structure. Because of the tremendous strains and resultant high stresses placed upon the hose and hose coupling during the period when the hose is extended from the first aircraft, difficulty has been encountered with either the hose breaking adjacent to the coupling, or slipping out of engagement with the coupling. A broad object of the present invention is to provide hose couplings which can be utilized without these difficulties occurring. Another broad objective of this invention is to provide effective devices of the class described which can be easily and cheaply manufactured.

The constructions of this invention may be briefly described as including: a tubular center fitting having external portions which are designed to engage a hose, a retainer, and a mechanism, such as a valve mechanism as previously described; a collet, the diameter of which may be varied; a ferrule; and a retainer, these parts being assembled as hereinafter described. The invention is, of course, more fully defined by the appended claims, and is best described with reference to the accompanying drawings, in which:

Fig. 1 is an expanded view, partially in section, of a hose coupling of the invention;

Fig. 2 is a longitudinal cross-sectional view of the construction indicated in Fig. 1 with the parts assembled;

Figure 3:
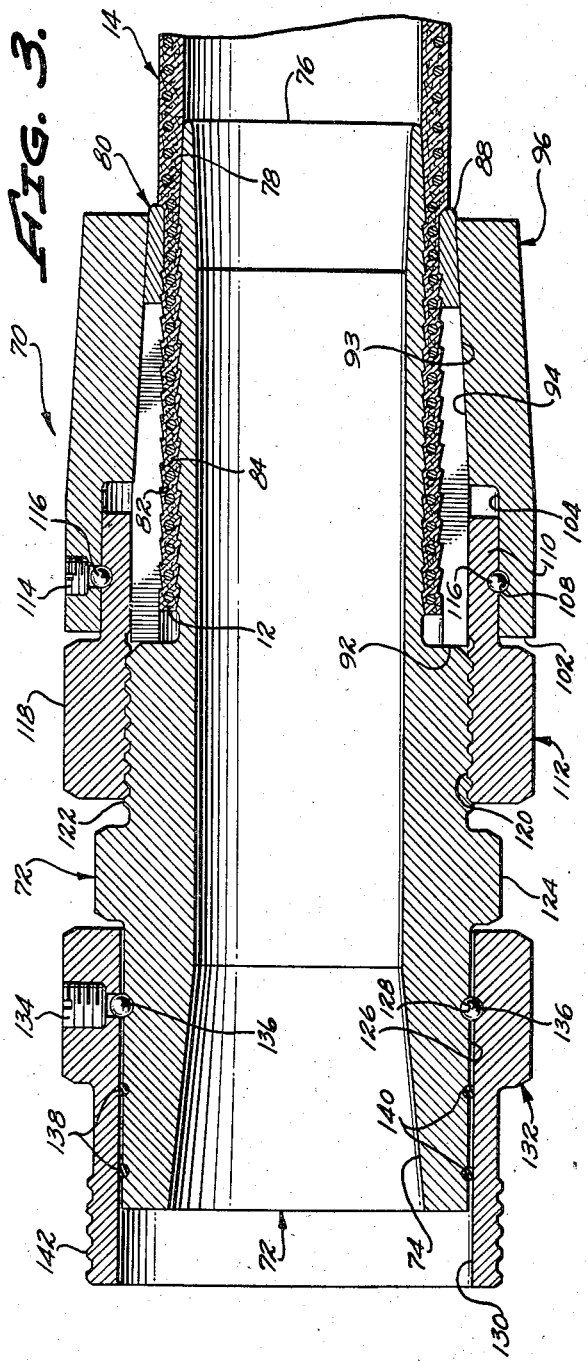
Fig. 3 is a view similar to Fig. 2 of a modified hose coupling of this invention.

The hose coupling 10 shown in Figs. 1 and 2 is designed to engage an end portion 12 of a hose 14 in such a manner that there is no danger of this hose slipping from the coupling, or breaking immediately adjacent to the coupling. The coupling 10 includes a tubular center fitting 16 having a central flow passage 18 extending through the length of the fitting.

Adjacent to the hose end 20 of the fitting 16, there is located a hose engaging external surface 22 which is preferably provided with a thread-like continuous projection 24 continuing in the form of a spiral about this surface. The side of the projection 24 away from the end 20 is preferably of steeper slope and less length than the side of the projection towards the end 20. This spiral-like projection 24 is arranged so as to be of a shape which is similar to the shape of a coiled wire 26 positioned within the hose 14 so as to provide reinforcement to this hose. By this expedient an efficient gripping type of action is obtained, and there is no tendency to pinch or otherwise lessen the effectiveness of the wire 26 within the hose 14.

The exterior surface of the portion of hose 14 in contact with surface 22 of center fitting 16, is engaged by a collet 28 composed of a plurality of individual curved sections 30, which are, for convenience, held together by snap rings 32 fitting within grooves 34 within these sections. It is readily seen from Figs. 1 and 2 that curved collet sections 30 are spaced slightly from one another so as to provide an internal generally cylindrical surface 36 and an external surface 38. This internal surface 36 has a series of projections 40 providing a discontinuous spiral similar to and surrounding the external spiral projection 24 in order to serve the same purpose as this latter projection.

The external surface 38 of the collet 28 is frusto-conical in shape, and is located so as to slope radially outward from the end center fitting 20 and is designed to be engaged by a ferrule 42 having a frusto-conically shaped internal surface 44 which is adapted to slide upon the collet surface 38, pulling the sections 30 together, decreasing the diameter of the collet 28. As illustrated in Figures 1 and 2, a plurality of projections 39, corresponding in number to the number of collet sections 30, can be provided on the inner surface of ferrule 42 to cooperate within longitudinal grooves 41 provided in the exterior surface of the collet sections 30. Such cooperation aids in maintaining the spaced relationship between the sections of collet 28. The exterior of the ferrule 42 is provided with an end portion 46 designed to be engaged by a wrench, and a threaded opposite end portion 48.

A cylindrical retainer 50 is used in the coupling 10 so that as the retainer is turned, interval threads 52 on this retainer engage the threads on ferrule end portion 48, pulling the ferrule 42 upon the collet 28, tightening the collet about the hose 14 so as to firmly hold this hose in position. Retainer 50 has an external surface 54 formed to be engaged by a wrench and is also provided with an inwardly directed end flange 56 designed to bear against a thrust washer 57 held between this flange 56 and an outwardly directed flange 58 formed on the center fitting 16 so as to prevent relative axial movement between the retainer 50 and center fitting 16 when the retainer is tightened.

The side of the flange 58 towards the end 20 is provided with means defining notch-like recessed surfaces 60 against which projecting lugs 62 on the sections 30 are designed to bear during assembly and use of the coupling 10. These surfaces 60 and ends 62 act to prevent rotation of the collet 28 when retainer 50 is tightened on ferrule 42.

The center fitting 16 is also provided with an externally threaded end portion 64, which is designed to be threaded into a conventional complementary coupling member on a supply or discharge device, and an adjacent surface 66 which is designed to be engaged by a wrench.

Figure 4:
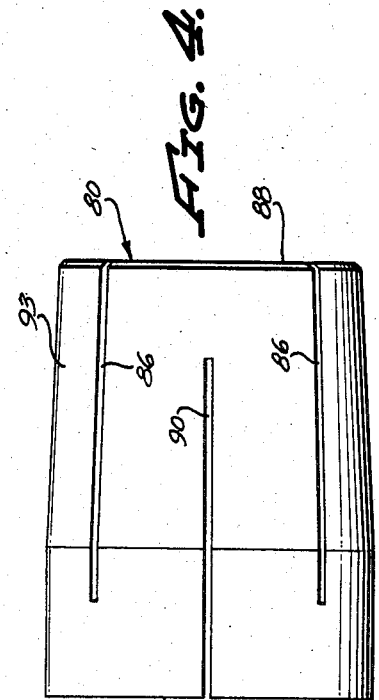
Figs. 4 and 5 are side and end views, respectively, of a collet employed in the construction illustrated in Fig. 3.
Figure 5:
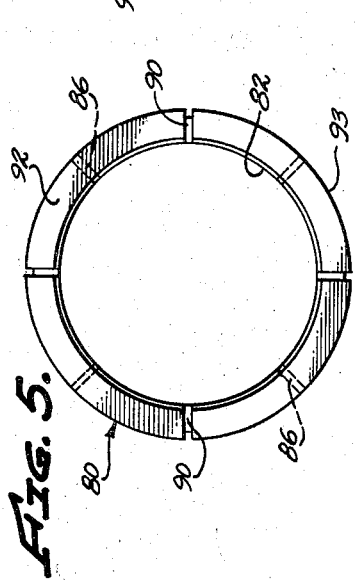

In Fig. 3 of the drawings there is shown a modified closed coupling 70 which includes a center fitting 72 which is provided with a central flow passage 74 of the essential category of the flow passage 18. Adjacent to an end 76 of this flow passage there is provided an external surface 78 of the same essential configuration and function as the surface 22. This surface 78 is designed to engage the interior of the hose 14. The end 12 of this hose actually engaged by the surface 78 is held in place in part through the use of a collet 80 serving the same function as the collet 28. This collet 80 is, however, formed as indicated in Figs. 4 and 5 so as to be in the shape of a generally cylindrical sleeve having projections 82 formed on the interior thereof. These projections correspond in size, shape and location to corresponding projections 84 formed on the external surface 78. It will be realized that both of these projections correspond to the projections 40 and 24 previously described.

The collet 80 is provided with a first series of longitudinal slots 86 extending from an edge 88 of the collet generally parallel to the axis thereof nearly to an edge 92 of this collet 80. A second series of longitudinal slots 90 are provided within the collet sleeve so as to be generally parallel to the slots 86. The second series of slots project into the collet 80 from the other edge 92 thereof, and extend nearly to the edge 88 of this collet. With this slot construction, a frusto-conical outer surface 93 on the collet 80 may be engaged by a similarly shaped internal surface 94 upon a ferrule 96 which is placed around the collet 80 so that the effective diameter of the collet sleeve 80 may be decreased, firmly holding the hose 14 between the surface 78 and the collet sleeve as the ferrule 96 is moved with respect to the collet 80.

Adjacent to an end 102 of this ferrule 96 there is provided an internal generally cylindrical surface 104 which is spaced from the exterior of the collet sleeve 80. Within this surface 104 there is provided part of a bearing trace 108, the other part of which is provided on a cylindrical flange 110 forming a part of a retainer 112. This flange is, as is apparent in Fig. 3 of the drawings, adapted to fit between the surface 104 and the collet sleeve 80. At least one plug 114 is located within the ferrule 96 for the purpose of introducing ball bearings 116 into and out of the bearing race defined by the two parts of the bearing race 108.

The retainer 112 is provided with an external surface 118 which is designed to be engaged by a wrench and with a threaded internal surface 120, the threads on which are used to engage appropriate threads 122 formed on the exterior of the center fitting 72 adjacent to the surface 78. With this construction when the retainer 112 is turned with respect to the center fitting 72, the movement of the retainer 112 is transmitted through the bearings 116 so as to pull the ferrule 96 with respect to the collet sleeve 80, tightening this collet sleeve about the hose 14. A portion 124 of the exterior of the center fitting 72 is formed so as to be engaged by a wrench in order to prevent rotation of the center fitting during rotation of the retainer 112.

Another portion 126 of the exterior of the center fitting 72 is formed of a generally cylindrical shape containing part of a bearing race 128, the other part of which is formed of a cylindrical interior surface 130 of an attaching cylinder 132. An appropriate plug 134 is provided within the attaching cylinder 132 for the purpose of introducing ball bearings 136 into this bearing race 128. Two sealing rings 138 are held within grooves 140 formed in the portion 126 so as to be disposed between the center fitting 72 and the attaching cylinder 132 in order to seal against leakage between these two members. Threads 142 are provided upon the attaching cylinder 132 for the purpose of securing a conventional coupling fitting (not shown) to the coupling 70. As is clearly apparent, either the rotatable end fitting 134 of the Figure 3 embodiment or the threaded end fitting 64 of the Figure 2 embodiment can be used with either coupling embodiment as desired.

The construction illustrated in Fig. 3 of the drawing is quite advantageous in that any twisting of a valve mechanism or drogue, attached to this coupling 70 during the use thereof for inflight refueling, is not transmitted to the hose 14, but is taken care of by the attaching cylinder 132 turning with respect to the center fitting 72. It is considered obvious from the drawings that axial forces are transmitted through the coupling 70 from the attaching cylinder 132 by means of the bearings 136. The construction illustrated in Fig. 3 of the drawings is also advantageous in that there is no tendency for the collet 80 to twist with respect to the hose 14, setting up undesired strain in this hose inasmuch as the ferrule moves axially with respect to the center fitting 72 because the ball bearings 116 do not transmit the twisting of the retainer 112 to the ferrule.

Both of the constructions illustrated in Figs. 2 and 3 are also quite advantageous inasmuch as during use of the couplings shown, as tension is applied to the hose the collet engaging the hose tends to move within the surrounding ferrule 80 so as to increase the compression of the hose on the center fitting over and above the compressive forces applied at the time of attaching the hose to the coupling causing the hose and coupling to be more firmly attached to one another.

Those skilled in the art will realize that the present invention is comparatively simple, and yet is exceedingly effective for the purpose described. Obviously a number of minor modifications may be made within the construction illustrated without departing from the essential teaching of this specification. All such modifications are to be considered as part of the inventive concept insofar as they are defined by the appended claims.

We claim as our invention:

1. A coupling, for attachment to the end of a hose, comprising: a tubular fitting including a first substantially annular end portion, a second substantially annular end portion coextensive with, substantially coaxial with and of less outside diameter than said first end portion whereby an integral shoulder is provided on an intermediate portion of said tubular fitting between said two end portions with at least one recess in said shoulder facing said second end portion and radially projecting deformations on the exterior of said second end portion; a radially contractible collet surrounding said second end portion in substantially concentric spaced relation thereto, one end of said collet abutting and restrained against axial movement in one direction by said annular shoulder and including at least one integral axially projected lug disposed in said at least one recess to prevent relative rotation between said collet and said tubular fitting; said collet having a frusto-conical outer surface with straight grooves therein between the ends of said collet, the largest diameter end of said collet being disposed adjacent said annular shoulder; said collet also including radially inwardly projecting deformations on the interior surface; a ring shaped member disposed around said collet having internal means including a frusto-conical inner surface to engage said exterior frusto-conical surface, and straight rib-like projections disposed in said straight grooves, to contract said collet substantially radially toward the outer surface of said second end portion upon axial movement of said ring shaped member toward the large diameter end of said collet, engagement of said lug and recess and of said rib-like projections and said straight grooves providing an effective non-rotatable relationship between said ring shaped member and said tubular fitting; a retainer nut engaging said first end portion and said ring shaped member for shifting said ring shaped member axially in said one direction relative to said tubular fitting; and means on said first end portion for attaching said coupling to another member.

2. A coupling as defined in claim 1, wherein said first end portion of said tubular fitting has a substantially cylindrical outer surface; said means on said first end portion includes a collar having an inner substantially cylindrical surface rotatably and concentrically disposed on the substantially cylindrical outer surface of said first end portion; concentric radially opposed grooves are provided in said two cylindrical surfaces; ring seal means are disposed in grooves, and ball bearing thrust means are disposed between said two cylindrical surfaces to provide relative rotation and absorb axial loads between said collar and said fitting.

References Cited in the file of this patent

UNITED STATES PATENTS

| | | |
|---|---|---|
| 143,229 | Dunning | Sept. 30, 1873 |
| 145,731 | Edson | Dec. 23, 1873 |
| 833,784 | Hicks | Oct. 23, 1906 |
| 1,175,834 | Stephens | Mar. 14, 1916 |
| 1,234,812 | Simmons | July 31, 1917 |
| 1,574,922 | Nelson | Mar. 2, 1926 |
| 2,120,275 | Cowles | June 14, 1938 |
| 2,228,018 | Scholtes | Jan. 7, 1941 |
| 2,333,349 | Weatherhead | Nov. 2, 1943 |
| 2,448,395 | Schaetzly | Aug. 31, 1948 |
| 2,544,712 | Miller | Mar. 13, 1951 |

FOREIGN PATENTS

| | | |
|---|---|---|
| 782,512 | France | Mar. 18, 1935 |
| 1,705 | Great Britain | Jan. 22, 1912 |